March 7, 1961 W. H. MOSIER 2,973,607
METHOD AND APPARATUS FOR PACKAGING FIBROUS MATERIALS
Original Filed June 8, 1950 10 Sheets-Sheet 1

Inventor:
WILLIAM H. MOSIER.
By
Attorneys

FIG-10-

March 7, 1961 W. H. MOSIER 2,973,607
METHOD AND APPARATUS FOR PACKAGING FIBROUS MATERIALS
Original Filed June 8, 1950 10 Sheets-Sheet 9

Inventor:
WILLIAM H. MOSIER.
By
Attorneys

March 7, 1961 W. H. MOSIER 2,973,607
METHOD AND APPARATUS FOR PACKAGING FIBROUS MATERIALS
Original Filed June 8, 1950 10 Sheets-Sheet 10

Inventor:
WILLIAM H. MOSIER.
By Stalhim & Overman
Attorneys

United States Patent Office 2,973,607
Patented Mar. 7, 1961

2,973,607
METHOD AND APPARATUS FOR PACKAGING FIBROUS MATERIALS

William H. Mosier, Pleasantville, Ohio, assignor to Owens-Corning Fiberglas Corporation, a corporation of Delaware Original application June 8, 1950, Ser. No. 166,965, now Patent No. 2,789,406, dated Apr. 23, 1957. Divided and this application July 18, 1956, Ser. No. 598,663

4 Claims. (Cl. 53—24)

This invention relates to method and apparatus for orienting fibrous materials into compact or packaged condition in a manner facilitating handling and transportation of such material. This is a division of my co-pending application, Serial Number 166,965, filed June 8, 1950.

It has been conventional practice in packaging or preparing fibrous materials, as for example materials formed of glass fibers especially usable for insulation purposes to stack predetermined lengths of fibrous mat in contiguous relation, compress the stack or assembly of mat lengths in a direction normal thereto and insert the compressed assembly into preformed paper bags or containers which are sealed or stapled to enclose the assembly. This method of packaging or conditioning fibrous mats for handling and shipment has been quite expensive for the reasons among others that the bags, being necessarily fabricated of heavy material, are costly and manual handling involves a large amount of labor. The bags or enclosures for the fibrous material must have a comparatively high tear strength to adequately withstand rough handling and resist the expansive force of the mats by reason of their tendency to return to normal thickness. Furthermore exteriorly applied compression to the assembled mats results in nonuniform compression of the mats and in many instances one or more of the stacked mat sections may be compressed to a degree sufficient to break or fracture the individual fibers thus reducing the resiliency of the mat. When such mats are unpacked for application and use, the fibers, if crushed or broken, will not spring back or revert to their normal expanded condition. The crushing or breaking of the fibers substantially reduces the insulating value, rendering the mats unsatisfactory and inefficient for the purpose intended.

Another method that has been employed in packaging loose mineral fiber mats was to manually roll up the mat material with a sheet of paper, the rolled package then subjected to externally applied compressive force and the compressed roll inserted in a paper bag or envelope. These operations were carried on entirely by manual means and were found to be expensive and unsatisfactory for many reasons. By manually rolling up the sheet of paper and fibrous mat, the fibers in the resulting roll formation were in a loose or fluffy condition. When an exterior compressive force was applied to the loose roll, the convolutions of the mat were unevenly compressed, the paper became wrinkled or torn and tended to "funnel in" toward the center causing objectionable bulges in the fibrous material. Furthermore it has been found unsatisfactory to compress the completed roll and reduce the volume to any substantial degree without overcompressing and fracturing the fibers in certain zones of the roll, a disadvantage as above pointed out. Even though many such difficulties have been encountered in forming roll packages of mineral fibers, such practice has been used with certain types of fibrous mats for particular uses. For example it is desirable to form rolled packages of wool bats formed of mineral fibers for use in the insulation of cooking ranges or stoves and other applications which preclude the utilization of a paper backing adhesively joined to the mass of fibers as the paper or other combustible packaging material must be removed before installation. Such bats of fibers may not be satisfactorily impregnated with a binder so as to impart mass integrity to the fibers as the binder will not withstand high heat.

The present invention embraces a method and apparatus for orienting a mass of mineral fibers or other insulating materials into package formation in an effective and efficient manner involving a reduction in the normal space occupied by the mass of fibers whereby extensive economies in the cost of packaging such materials are obtained as well as a substantial reduction in shipping space required for transportation, the package configuration being of a character facilitating the handling and installation of the mass of fibers in places of use.

The invention comprehends the provision of method and apparatus for efficiently packaging fibrous products resulting in a high degree of uniformity of packaged product.

An object of the invention is the provision of a method and means for progressively compressing a mass of fibers, as for example glass fibers, during package formation wherein the compression factor in the resulting package is substantially uniform throughout the fibrous mat, the method admitting of effective control during the package forming operation so as to vary the compression factor and consequent thickness of the mat as desired.

An object of the invention is the provision of a method of packaging a mat of fibrous material with paper or the like in a manner whereby the paper, per se, forms an envelope or closure for the mat thus eliminating the use of bags or other additional protective coverings.

The invention is inclusive of a method and apparatus for efficiently and effectively conditioning and packaging mats or bats of mineral fibers whereby the fibers are compressed in a manner avoiding injury thereto yet producing a package of reduced volume without impairing the insulating value of the mats or bats.

An object of the invention is the provision of a method of continuously forming and collecting mineral fibers into a linear mass and conveying the mass to a severing zone where the same is cut into sections and the sections successively conveyed to a packaging zone and formed into roll packages by mechanical means.

Another object resides in a method of compacting a mass of mineral fibers into reduced volume without fracturing or crushing the fibers or impairing the characteristic of the mass of fibers to revert to its normal volume upon removal of the compacting constriction.

Another object is the provision of apparatus for enclosing or enveloping a mass of mineral fibers in a length of sheet material embodying means for establishing or orienting a section of the sheet material with the mass of fibers of adequate dimension to encompass the mass in rolled formation without adhesively joining the sheet material and mass of fibers whereby the latter may be readily separated from the sheet material at the time of installing the mass of fibers in a place of use.

Another object is the provision of automatically actuated and controlled means for directing a mat of mineral fibers into operative association with a package forming instrumentality and establishing pressure against the mat concomitantly with the operation of forming the package to reduce the normal thickness of the mat substantially uniformly throughout the area thereof.

Another object is the provision of means for continuously advancing a mass of mineral fibers and concomitantly feeding a sheet of wrapping materials into contiguous relation with the mass at a linear speed greater than that of the mass and orienting the excess wrapping material into successive loop formations adjacent the mass of mineral fibers.

Another object of the invention is the provision of a method of packaging mats or bats of mineral fibers and apparatus for carrying out the method which is equally effective in packaging mats or bats embodying sheet material adhesively joined thereto or those having a separable contiguous sheet enveloping the mats or bats.

Another object of the invention resides in a means or apparatus for mechanically rolling a mat or quantity of fibrous material into a roll configuration and simultaneously progressively compressing the material during the package forming operations whereby the material is compressed throughout its entire area to a uniform degree and hence of uniform thickness whereby a high factor of compression is obtainable without liability of fracturing the individual fibers in the mat.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 3 is a side elevational view illutsrating a form of apparatus for forming masses of fibers into roll configuration.

While the method and apparatus are herein illustrated as particularly applicable to the collection and packaging of mineral fibers, it is to be understood that the principles of the invention may be utilized to collect, compact or form other loose or resilient materials into roll formation for various purposes.

Figure 1:
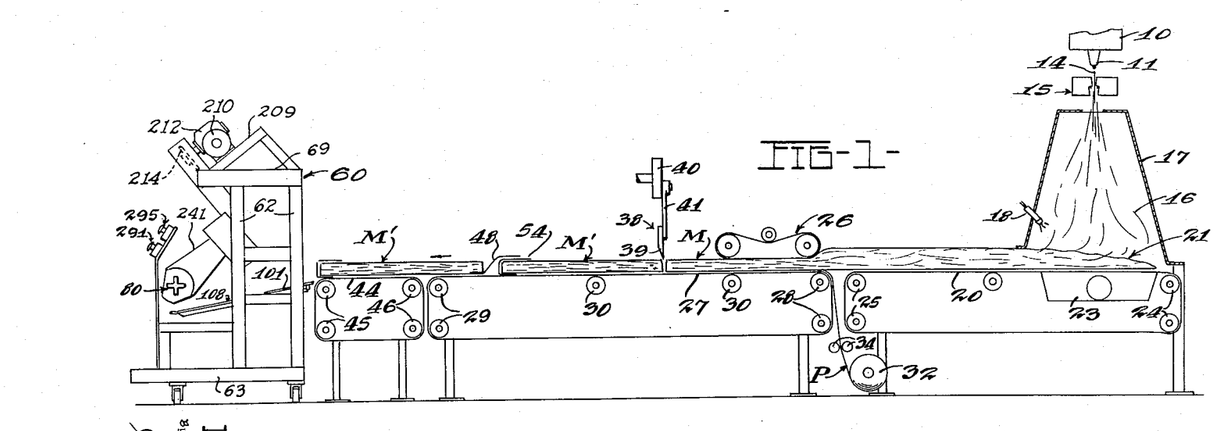
Figure 1 is an elevational diagrammatic view of apparatus for carrying out the method of the invention.

Referring to the drawings in detail and initially to Figure 1 there is illustrated an apparatus for carrying out the method of compacting or rolling a mat of fibrous material into a generally cylindrically shaped configuration or package. The invention has particular utility in compacting mats formed of blown glass fibers attenuated to desired fineness but the use of the invention is not limited to processing such fibers but may be utilized with various types of resilient fibrous mat constructions. There is illustrated in Figure 1 a forehearth 10 adapted to contain a body of molten glass or other fiber forming material beneath which is disposed a feeder bushing 11 having a plurality of orifices or outlets through which flow streams 14 of molten material which are attenuated into fine fibers 16 by suitable means as for example jets of steam or air emanating from blowers 15. The fiber attenuation is preferably carried on within a hood or enclosure 17 which directs the fibers to a continuously moving foraminous conveyor 20 upon which the fibers accumulate in a mass forming a mat M in the fiber collecting or mat forming zone 21 within the hood 17. A suction chamber 23 is disposed beneath the foraminous conveyor 20 adjacent the mat forming zone, the chamber being connected with a suction producing fan in order to establish a zone of differential or subatmospheric pressure to aid in the collection of the glass fibers.

In this method of mat formation, the fibers are collected in random or haphazard fashion forming a mat M of substantial thickness and endowed with a high degree of resiliency. The foraminous conveyor 20 is the endless belt type extending around guide rollers 24 and 25. The upper level or fiber supporting zone of the conveyor traveling in a lefthand direction as viewed in Figure 1 conveys the fibrous mat away from the mat forming zone 21.

The method and apparatus of the present invention have particular utility in connection with the formation, processing and packaging of mats of glass fibers especially adapted for insulation purposes in stoves and the like. When mats are produced for such uses, it is desirable to distribute a small quantity of lubricant through the mass of fibers in order to minimize abrasion. To this end a jet or nozzle 18 may be disposed in the hood 17 for spraying liquid lubricant upon the fibers as they are collected in the mat forming zone. It is to be understood that the process and apparatus of the invention may be used for fabricating and packaging various types of mats formed of fibrous material for uses or installations where it may be desirable to apply a suitable adhesive or binder to the fibrous mat. When a binder or adhesive is to be applied to the mat, nozzles similar to the type illustrated at 18 may be used or the binder or adhesive applied exteriorly of the hood 17 to the collected fibers by a suitable applicator.

Disposed in alignment with the conveyor 20 is a second conveyor 27 of the endless type which is supported on suitable guide rollers 28 and 29, the upper level being additionally supported upon rollers 30 which may be spaced as desired to effect a uniplanar linear travel of the mat M. The conveyor 27 preferably travels in a linear direction at substantially the same speed as the conveyor 20. Means are provided for advancing or feeding sheet material as, for example, paper or other packaging or mat enclosing medium for orientation with the formed mat, the sheet material being directed between the upper level of the conveyor 27 and the mat M into contiguous relation with the mat. To this end a supply roll 32 of sheet material or paper is disposed adjacent one end of the conveyor 20, the paper P being continuously advanced by suitable feed rolls 34 so that the paper passes through a space provided between the continuous conveyors 20 and 27 as illustrated in Figure 1. The sheet of paper passes over the upper lead roller 28 onto the upper level of the conveyor 27 and is moved thereby in a linear direction concomitantly with the advancing mat M.

Means are provided for severing the moving mass or mat of fibers into sections M′ of predetermined length. The mat severing means 38 may be of any suitable type as for example a transversely extending shearing bar or knife 39 operated by a crank 40 through the medium of suitable linkage 41. The mat severing knife 39 may be adjusted to sever the paper or backing sheet P concomitantly with the severing of the mat, or to sever the mat into successive sections and periodically sever the paper whereby two or more mat sections are disposed on one length of paper. In the arrangement illustrated in Figure 1 the paper backing sheet P is severed concomitantly with the mat so that the length of paper coincident with the mat is of the same length as the severed mat section M'. In a modified form of arrangement hereinafter described, the paper backing sheet is made of greater length than that of the adjacent mat section.

Disposed in alignment with the conveyor 27 is a third conveyor 44 which is supported by rollers 45 and 46, the conveyor 44 being preferably driven so as to advance the successive bats or mat sections at a greater speed than the conveyor 27. The higher speed of the conveyor 44 is for the purpose of advancing the foremost mat section M' away from the next succeeding section preparatory to the lead mat section entering the mat compacting and packaging apparatus.

In order to facilitate efficient operation of the apparatus in compacting and packaging the bats or mats, it is desirable that the lead edge of each fibrous mat be provided with or encompassed by paper or similar material, and in order to completely enclose the rolled package an additional length of paper is provided extending rearwardly of each mat section. To this end provision is made for attaching or utilizing a fold of paper around the forward or leading edge of each mat section and an additional amount of paper at the trailing edge thereof.

Figure 2:
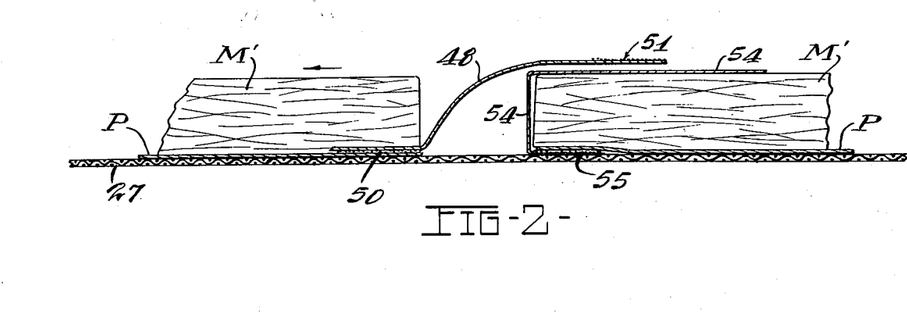
Figure 2 is an enlarged fragmentary view illustrating one method of orienting sheet material adjacent the ends of fibrous mat sections.

As illustrated in Figures 1 and 2, a strip of paper 48 preferably the same width as the linear sheet of paper P is adhesively joined to the section of paper P disposed adjacent a mat section. An operator applies adhesive to the paper P in the zone indicated at 50 and to the strip of paper 48 at the zone indicated at 51. The purpose of sheet 48 is to establish a paper enclosure for the roll package after it has been formed in the packaging machine in a manner hereinafter explained. The strip of paper 54 is adapted to be adhesively joined as at 55 to the lead edge of the paper P adjacent a bat or mat section, and is folded over the mat into the position shown in Figure 2. As the mat sections carried by conveyor 27 are moving at a comparatively low speed sufficient time is had to enable the operator to apply adhesive to the strips 48 and 54 and affix the strips of paper in the positions shown in Figures 1 and 2. The performance of these operations is facilitated by the fact that the leading section M' of mat and paper is being moved by conveyor 44 at a more rapid rate than the succeeding mat and paper section on the conveyor 27 and hence there is a progressively increasing space formed between adjacent mat sections when the conveyor 44 is effective to engage the leading mat section to move the same into the packaging machine.

The package forming machine or apparatus is indicated by numeral 60 and is illustrated in Figures 3, 4, 5, 7 and 8. The packaging apparatus 60 is inclusive of a frame 61 having vertical posts 62 supported upon a base structure 63. The base structure may be supported upon suitable casters or wheels 53 for purposes of portability, if desired. The posts or struts 62 are joined by means of longitudinally extending bars 64, 65, 69 and transversely extending members 66, 67 and 68. Also supported upon the base structure 63 is an auxiliary frame 70 comprising channels shaped members 71, upwardly extending frame members 72, and horizontal members 74 carrying journals or bearings 76 in which is revolubly mounted a shaft 78. As particularly shown in Figure 4 the shaft 78 supports a package forming instrumentality in the form of a mandrel 80, the mandrel having a noncircular configuration in cross section to facilitate the establishment of a friction drive component with the mat of fibers in order to collect or roll up the mat of fibers upon the mandrel. The mandrel has been illustrated as of Greek cross formation in cross section, but it is to be understood that any suitable form of undulated surface configuration may be employed which will give a satisfactory operative engagement with the mat for collecting or shaping the same into a package.

Driving means is provided for rotating the mandrel of a character which will provide for variable speed of the mandrel to compensate for the enlarging roll of the mat formation as it is collected in scroll-like formation on the mandrel. While any suitable driving means may be employed, there is illustrated a fluid operated motor 82, for example, an air motor which is adaptable for operation at varying speeds yet capable of ample torque for rotating the mandrel in a manner to satisfactorily collect the mat of fibers thereon. The motor 82 is suitably supported upon the supplemental frame 70, the shaft of which is connected by means of chain and sprocket means with the shaft 78 to drive the latter and the mandrel 80. The air motor is also arranged to establish an operative drive through the medium of gears 92, 93, shaft 95, and a sprocket 96 which is connected by means of a chain 97 with a sprocket 98 for driving or operating a means for initiating the start of a roll formation of the mat upon the mandrel 80, which mechanism will be hereinafter described.

The roll packaging apparatus of the invention is provided with means for directing or guiding the mat of fibers into juxtaposition with the mandrel 80 in position to facilitate the collection of fibers upon the mandrel. The conveyor 44 illustrated in Figure 1 terminates adjacent a plate or mat support 101 which is pivotally mounted by means of a shaft 102 supported upon a suitable bracket 103 carried by the frame members 62. The forward portion of the mat support 101 is provided with adjusting means 105 to elevate or lower the forward portion of the mat support 101. Disposed adjacent the plate 101 is a table or platen 108 preferably formed with a uniplanar upper surface adapted to support the mat. The table 108 is provided with a bar 111 which is pivotally supported upon suitable bearings carried by the frame members 67. In this manner the table 108 is adapted for pivotal movement about the axis of the bar or shaft 111 for a purpose to be hereinafter explained.

Figure 5:
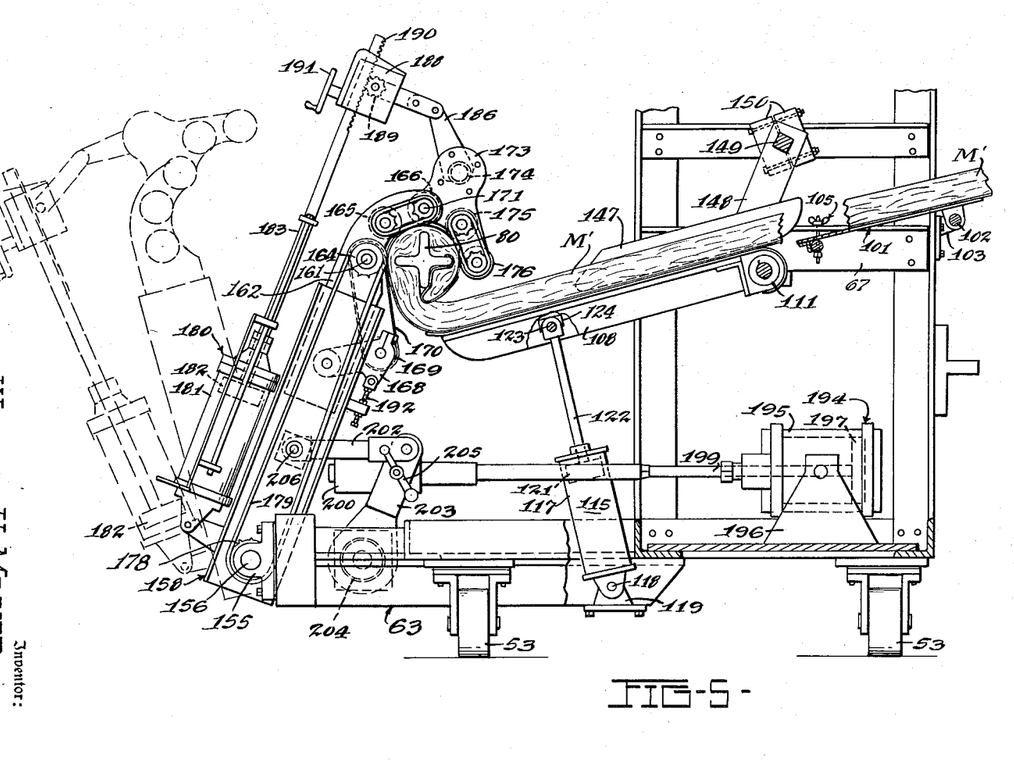
Figure 5 is an elevational view illustrating the relative positions of the mechanisms at the initial stage of package formation.

Means are provided for exerting an upwardly directed pressure upon the table 108 acting in a general direction of the mandrel 80 for the purpose of compressing or compacting the mat of fibers to a certain degree or thickness during the collecting or roll forming operation. It has been found that a fluid actuated means provides a satisfactory medium for exerting pressure on the fibers. As particularly shown in Figures 3 and 5, the fluid actuator 115 is inclusive of a cylinder 117 connected at its lower end by means of a pivot pin 118 with a bracket 119 supported upon the frame of the machine. The cylinder 117 is equipped with a piston 121 secured to a rod 122, the upper extremity of which is connected by means of a pivot pin 123 with a bracket 124 fixedly secured to the table 108. By the introduction of fluid under pressure such as air into the cylinder beneath the piston 121 a force is exerted upon the table to bias the same to its uppermost position as illustrated in Figures 3 and 5. A suitable adjustable pressure relief means 126 is intercalated in the fluid pressure line whereby the upwardly directed pressure acting upon the piston 121 may be controlled so that during downward movement of the table 108 during the roll or package formation of the mat, the pressure may be maintained at a substantially constant value to establish an unvarying component of force acting against the mat of fibers during the package forming operation in order that the several convolutions of the mat collected upon the mandrel will be compressed to substantially equal thickness.

Figure 4:
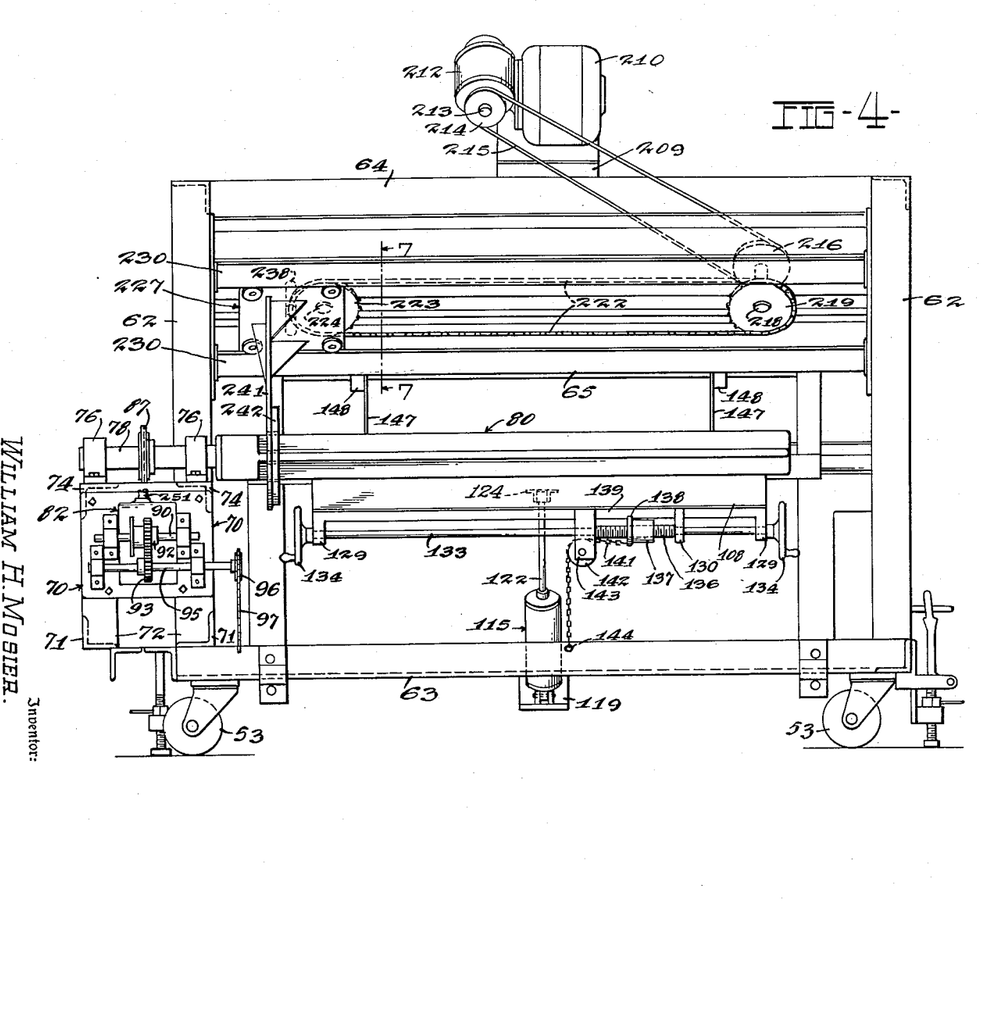
Figure 4 is a front elevational view of the apparatus shown in Figure 3 with the package roll starting means removed.

The apparatus is inclusive of means for determining or limiting the uppermost pivotal movement of the platen or table 102. As illustrated in Figure 4, the table 108 is provided with depending brackets 129 and 130 which journally support a shaft 133, the ends of which are provided with manipulating means or hand wheels 134 for rotating the shaft. An intermediate portion 136 of the shaft is threaded to receive a threaded nut or bushing 137 restrained against relative rotation by means of an extension 138 carried by the table 108. The bushing 137 is connected to a flexible element or chain 141 which takes over a pulley 142 journaled upon a bracket 143 depending from the table 108, the chain being anchored to the frame of the machine as indicated at 144. It will be seen that the vertical dimension of the chain 141 determines the uppermost position of the table 108. As the chain is connected to bushing 137 which is adjustable along the threaded section 136 by rotation of the shaft 136 through the manipulation of one of the hand wheels 134, the position of the bushing 137 may be adjusted to regulate or control the uppermost limit of movement of the table 108.

Lateral guiding means for the mat of fibers is provided as illustrated in Figures 4 and 5 and is inclusive of members or vanes 147 secured to brackets 148 mounted upon a bar 149 secured to the frame of the machine. The brackets 148 are adjustably supported upon the bar by means of clamps 150 so as to regulate the space between the vanes or guides 147 to accommodate mats of different widths.

The initiation or starting of a roll package by bringing the lead edge of the mat of fibers into frictional engagement or contact with the mandrel 80 may be accomplished in several ways. It has been found that an operator may manually bring the lead edge of the mat into engagement with the rotating mandrel until a first convolution of mat is completed after which the frictional component between the convolution of the mat and the mandrel is sufficient to draw the mat around the mandrel in convoluted or scroll formation to produce a substantially cylindrical package.

Figure 6:
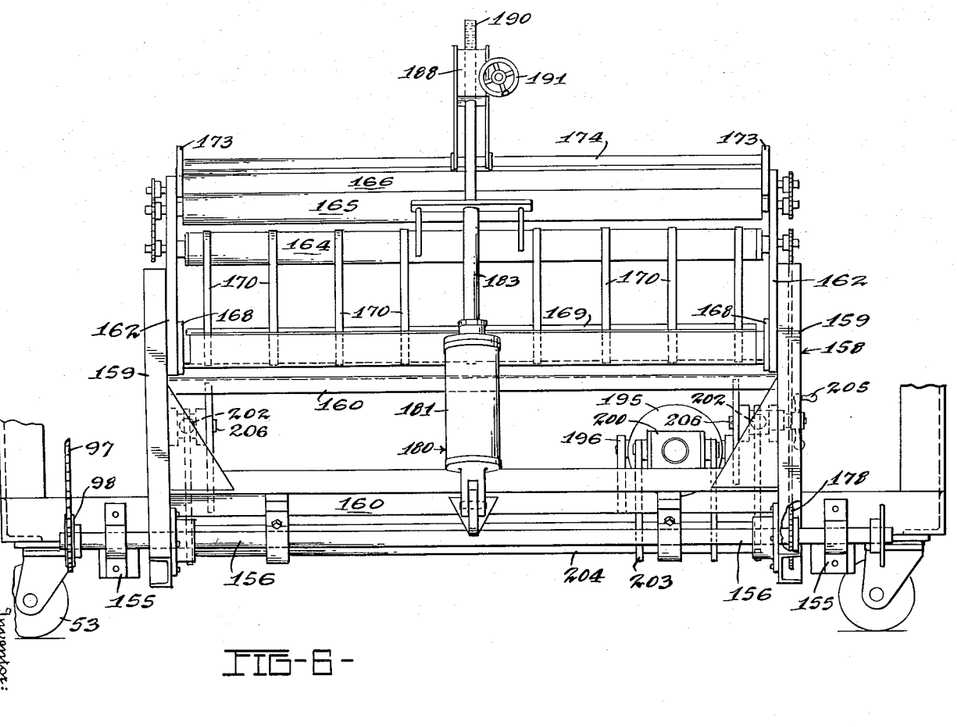
Figure 6 is front elevational view illustrating a means for initiating or starting a roll package.

The arrangement is inclusive of automatically actuated means for bringing the mat sections M' into operative engagement with the mandrel 80 whereby each section and the adjacent wrapping sheet may be collected upon the mandrel to form a package. Figures 3, 5 and 6 illustrate one form of mechanical means for accomplishing this purpose. Secured to the frame 63 of the packaging machine are pillow blocks 155 in which a shaft 156 is journaled, one end of the shaft being provided with the sprocket 98 connected by means of chain 97 (shown in Figure 4) with a driving means, in this form the driving means being the mandrel actuating motor 82. As shown in Figure 6, a suitable starter frame 158 is mounted upon the shaft 156 for oscillatory movement about the axis of the shaft and is inclusive of struts 159 and transversely extending members 160. Secured to each of the struts 159 is a member 162 upon which are journaled rollers 164, 165 and 166. Pivotally connected to the struts 159 are brackets 168 journally supporting a roll 169. A plurality of mat feeding belts 170 take over the rolls 164 and 169 for directing the end portion of the mat in an upward direction. The brackets 168 may be adjusted by means 192 to establish a desired tension in the belts 170.

Pivotally supported upon the shaft 171 carrying the roll 166 is a pair of brackets 173 joined together by means of member 174, the brackets 173 journally supporting rolls 175 and 176. The shaft 156 is provided with a sprocket 178 which is connected by means of a chain with a sprocket mounted upon the shaft carrying the roll 164. The rolls 165, 166 and 175, 176 are simultaneously driven by means of suitable chain and sprocket mechanisms disposed adjacent the ends of the rolls as illustrated in Figure 6. The rolls 164, 165, 166, 175 and 176 all rotate in a clockwise direction as viewed in Figure 5, in order to direct and convey the mat M' into driving engagement with the mandrel 80. The belts 170 also travel in the same direction and cooperate with the rolls to initiate engagement of one complete convolution of the mat upon the mandrel.

The brackets 173 carrying the driven rolls 175 and 176 are pivotally movable about the axis of the shaft 171 so that the rolls may be actuated to the position illustrated in Figure 5 to facilitate guiding the mat around the mandrel. Means is provided for moving the brackets 173 and includes a power actuator 180 provided with a cylinder 181 in which is reciprocably disposed a piston 182 the piston rod 183 having a rack portion 190 cooperable with mechanism contained within a housing 188 and manipulated by a handwheel 191 to adjust the relative position of the housing 188 on the rod 183. The housing 188 has a portion pivotally connected to an arm 186 mounted on the bar 174 to effect movement of brackets 173 and rolls 175, 176. The admission of pressure fluid into the cylinder 181 beneath the piston 182 causes upward movement of the rod 183 and housing member 188 and consequent relative movement of the brackets 173 to move the rolls 175 and 176 to the position indicated in full lines in Figure 5. The admission to the cylinder 181 of pressure fluid above the piston 182 causes downward movement of rod 183 and counterclockwise pivotal movement of brackets 173 and rolls 175, 176 to elevate the rolls relative to the mandrel 80.

Provision is made for moving the roll starter frame 158 about the axis of shaft 156. As shown in Figure 5, a power actuator 194 is inclusive of a cylinder 195 pivotally supported by means of a trunnion 196, the cylinder accommodating a piston 197 connected to a piston rod 198. The rod 199 is connected to mechanism contained within a housing 200 for adjusting the effective initial position of the roll starter frame and mechanism carried thereby through the medium of connecting links 202 joined to the starter frame by shafts 206. The connecting links 202 are pivotally joined at their other ends to arms 203 secured to a connecting member 204, the relative position of members 203 and connecting links 202 being adjustable relative to the housing 200 and piston rod 199 by mechanism (not shown) adapted to be manipulated by a crank 205.

Means are provided for stripping or removing the completed package from the mandrel or package forming instrumentality 80 illustrated in Figures 3, 4, 7 and 8. Mounted upon frame members 209 is an electrically energizable motor 210 preferably equipped with a gear reduction mechanism contained within a casing 212. The shaft 213 driven by the speed reducing mechanism supports a sprocket 214 connected by a chain 215 with a sprocket 216 mounted upon a shaft 218 journaled in suitable bearings 220 carried by the frame of the machine. A sprocket 219 on shaft 218 is connected by means of a chain or other operative means 222 with a sprocket 223 mounted upon a shaft 224 journaled in bearings carried by the frame.

Figures 7, 8:
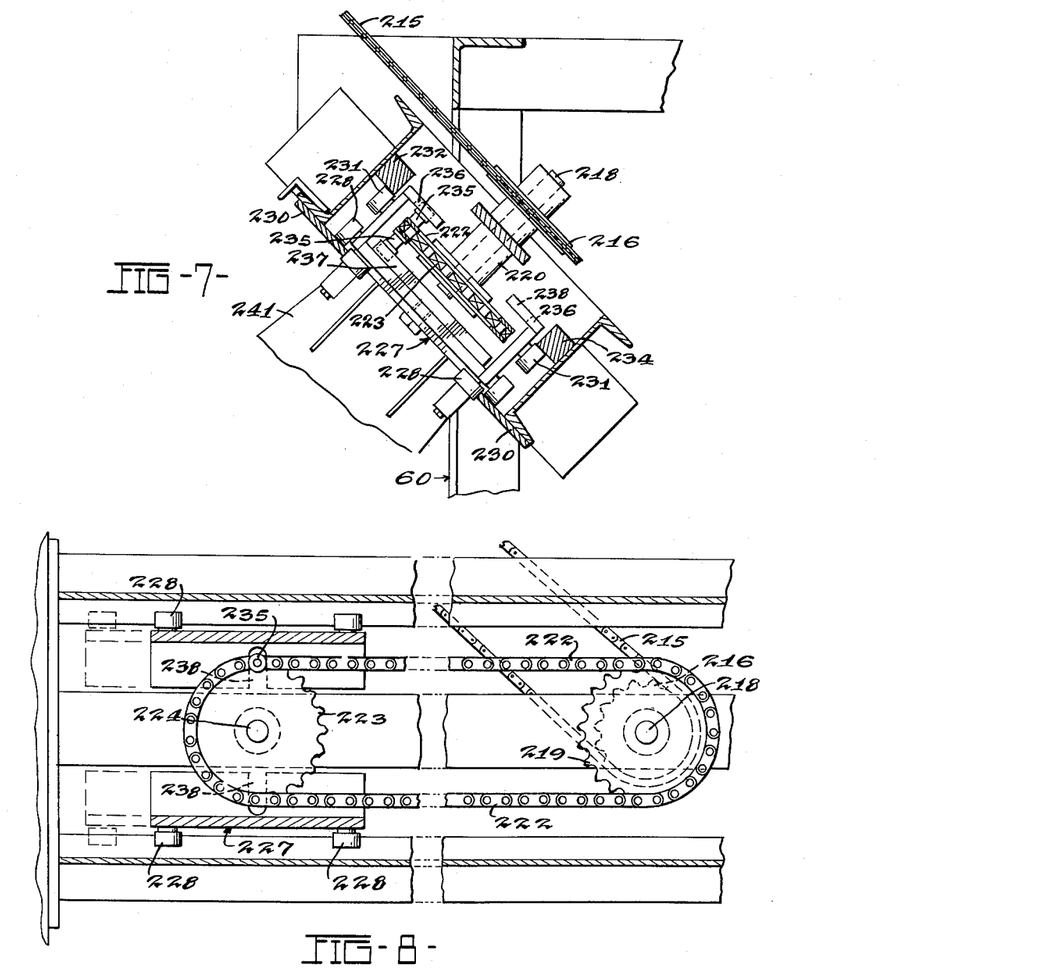
Figure 7 is a fragmentary sectional view taken substantially on the line 7—7 of Figure 4 illustrating a mounting for a package stripping means.
Figure 8 is an elevational view partly in section showing the package stripper actuating means.

A carriage 227 is mounted upon the frame by means of rollers 228 engaging in stationary ways or tracks 230. One link of the chain 222 is associated with a pin or projection 235 which extends from both sides of the chain 222 as shown in Figure 7. The carriage is equipped with plates 236 and 237 formed with slots 238 to accommodate the extremities of the shaft 235. By means of the slots in the plates 236 and 237 cooperating with the projecting pin 235, reciprocable movement of the carriage 227 in a direction parallel with the axis of the mandrel 80 is obtained.

Secured to the carriage 227 is a forwardly extending arm or member 241 having an opening in which is journaled a plate 242 of annular configuration, the member 241 having an opening therein through which projects the mandrel 80. Through the medium of the carriage 227 supporting the arm 241, reciprocable movement of the member 241 is had parallel with the axis of the mandrel 80 and operates to remove or strip the formed package from the mandrel.

Figure 9:
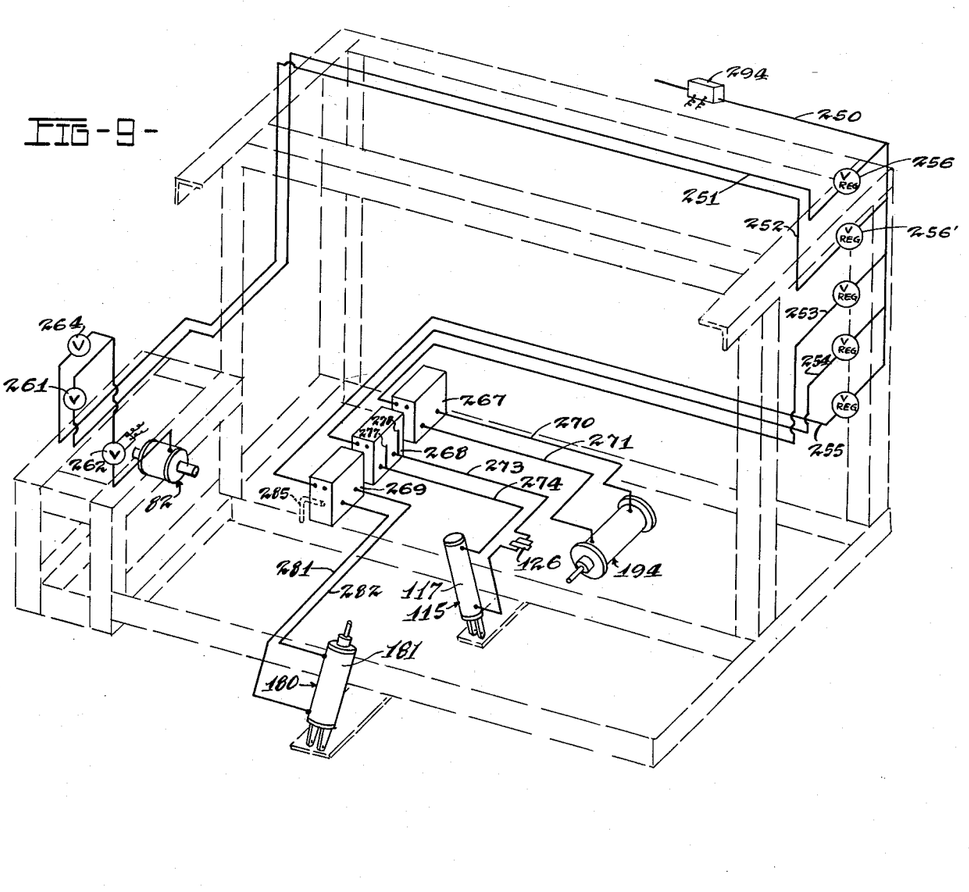
Figure 9 is a schematic view of pressure fluid actuating devices and fluid conveying lines for components of the apparatus.
Figure 10:
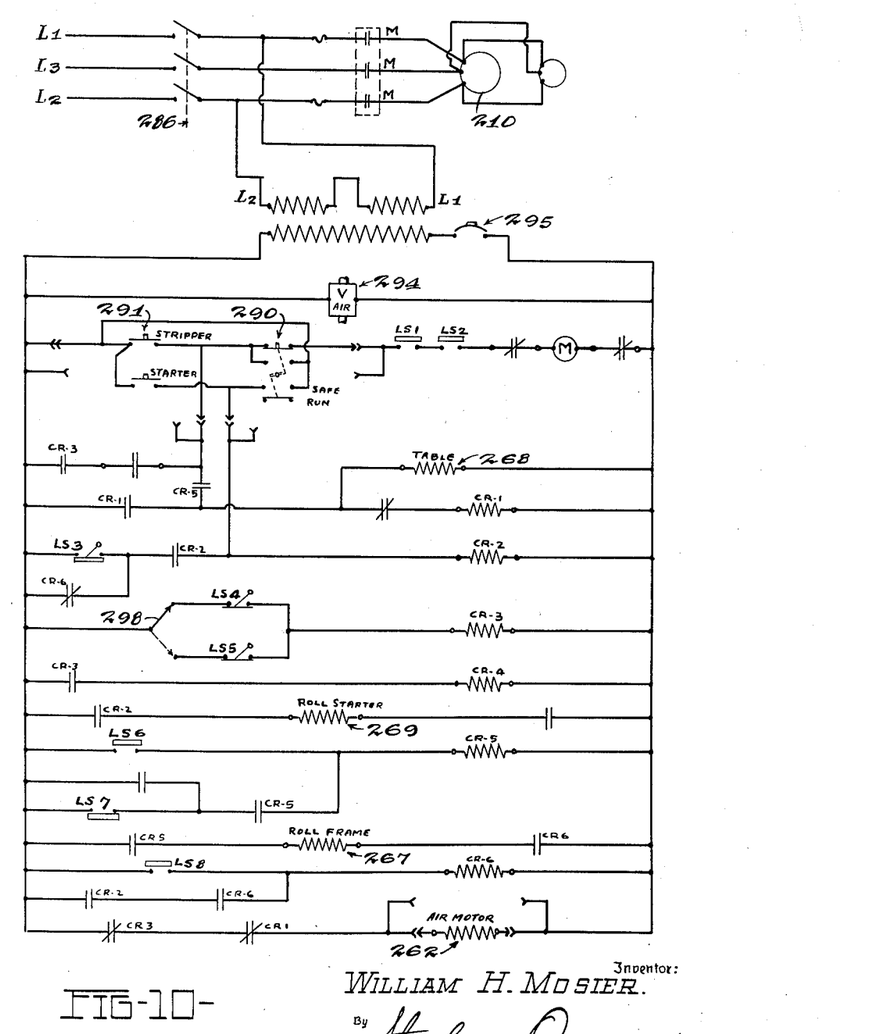
Figure 10 is a diagram of the electrical actuating and control devices for various components of the packaging apparatus.

Various components of the apparatus are preferably actuated by a pressure fluid means as for example, compressed air although a liquid such as oil may be utilized as an actuating medium. Figure 9 exemplifies in schematic form the piping or means for conveying pressure fluid to the mechanism actuators and Figure 10 diagrammatically illustrates the electrical circuits and control devices for initiating proper sequential operation of the mechanisms.

With reference to Figure 9 a supply pipe or line 250 is arranged to convey compressed air or other actuating fluid to pipes or lines 251, 252, 253, 254 and 255 each of which includes an adjustable pressure regulator. The fluid pressure line 251 is connected through a suitable manually operated valve 261 and solenoid operated valve 262 with the fluid actuated motor 82 adapted to actuate or rotate the package forming instrumentality or mandrel 80. The fluid pressure regulator 256' intercalated in the line 252 may be regulated to establish a different pressure so that through manipulation of the manual means 261 and 264, different fluid pressures may be had for operating the fluid motor 82.

Electrically actuated and controlled means in the form of four-way, fluid directing or diverting valves may be provided for actuating the starter frame 158, the roll starter actuator 180 and the platen or table lift actuator 115. Such electrically controlled valves are illustrated at 267, 268 and 269. The fluid line 253 conveys pressure fluid to the valve 267 from which fluid pressure lines 270 and 271 are arranged to alternately convey pressure fluid to the ends of the cylinder 195 of the starter frame actuator 194. The pressure line 254 is arranged to convey pressure fluid to the four way valve 268 from which fluid lines 273 and 274 alternately convey pressure fluid to the respective ends of the cylinder 117 of the platen or actuator 115. An adjustable automatic pressure relief valve or regulator 126 is intercalated in the line 273 for maintaining a substantially constant pressure beneath the piston in the table actuating cylinder during a roll forming or packing operation. The relief valve 275 may be adjusted or regulated to maintain a particular desired pressure beneath the piston to effect a predetermined degree of compression of the fibrous mat. Pilot fluid pressure lines 277 and 278 are intercalated with the control valve mechanism 268 which are connected to a small actuator (not shown) for operating limit switch means designated LS7 on Figure 10.

Compressed air is conveyed to the solenoid actuated valve 269 which is connected by lines 281 and 282 with the respective ends of the cylinder 181 of the roll starting actuator 180. The exhaust or spent air ejected from the actuators is preferably directed to a zone beneath the machine through exhaust tubes 285 one of which is shown in Figure 9. In the event that it is desired to utilize a liquid as for example, oil under pressure as a motivating medium to operate the components of the apparatus, a return oil line would be provided from the solenoid control valves to an oil supply reservoir.

With particular reference to Figure 10, the power line is indicated by L1, L2 and L3, a master switch being indicated for the power line at 286. The lines L1 and L2 are connected with the various switches and control devices for the actuating components of the apparatus. A manual switch 295 forms a component of the electrical circuits illustrated in Figure 10 as a master control for said circuits. A safety switch is indicated at 290 and a switch for initiating the operation of the package stripper is illustrated at 291. Limit switches LS1 and LS2 are, respectively associated with the platen or table 108 and the roll starter frame 158 for conditioning the circuit to permit the operation of the motor 210 actuating the package stripping device or arm 241. In Figure 10 the table control solenoid valve is indicated at 268, the roll starter control at 269, the roll starter frame control solenoid 267 and the air motor control solenoid 262. A solenoid controlled valve mechanism 294 connected in the main pressure fluid supply line 250 as shown in Figure 9 is provided as a master control for the pressure fluid lines.

The control circuits are further inclusive of a limit switch LS3 which is operated by movement of the roll starter frame, and limit switches LS4 or LS5 dependent upon the particular position of the switch 298 conditions the stripper motor circuit for operation in the proper cycling sequence of the various components and mechanisms. Limit switch LS6 is associated with the roll starter actuator 180 for conditioning the circuit thereof for proper operation. Limit switch LS7 is controlled by the particular position of the mat supporting platen or table 108, and limit switch LS8 is controlled by the operation of the roll starter frame actuator 195. The circuits include several current relays diagrammatically shown in Figure 10 which operate in conventional manner supplementing the limit switches for establishing current flow to the several mechanisms in proper sequence to attain successive operation of the mechanisms for compacting or packaging the fibrous mats.

The arrangement or apparatus for carrying out the method functions in the following manner: The fiber forming material from the forehearth 10 is discharged in the form of molten streams 14 which are attenuated into fine fibers under the influence of jets of air or steam, the fibers being discharged into the hood 17 for deposition upon the continuously moving conveying means 20. The fibers are collected and built up on the conveyor 20 into a mat of resilient fibers which may be of a thickness of several inches. The conveyor 20 moves the mat of fibers beneath a mat leveling or conditioning device 26, the continuously formed mat M being moved by the conveyor means 20 onto a conveyor means 27. A sheet of backing material from a supply 32 which may be paper or the like is conveyed into contiguous relation with the mat M adjacent the conveyor 27 by means of the sheet feeding devices 34. In the arrangement disclosed in Figure 1, the feed rolls 34 are driven by means (not shown) at a speed which will feed the sheet of paper P at the same speed as the movement of the mat M. The mat M and the paper P are moved simultaneously by the conveyor 27 to a mat severing zone. When a predetermined length of mat has moved past the severing means 38, the latter is actuated by timing mechanism (not shown) to sever the mat and backing sheet to form a mat section M'. The conveyor 27 advances the severed mat sections M' and the leading section is moved into engagement with a conveying means 44 which is adapted for linear travel at a higher rate of speed than that of the conveyor means 27. Thus the speed of the leading mat section under the influence of the conveyor 44 is increased so that the leading mat section is gradually pulled away from the succeeding mat section as shown in Figures 1 and 2.

As each mat section M' approaches the conveyor 44, the leading edge of the section is encompassed or covered with a sheet material to minimize the crushing or disintegration of the mat at the start of the package forming operation. The operator inserts the strip of paper 54 which is fastened or adhesively joined by means 55 to the length of paper P adjacent the mat section. The added strip of paper 54 is inserted by manual means in the embodiment illustrated in Figures 1 and 2, but an added length of paper may be supplied with each mat section in a manner hereinafter described. The paper strip 54 envelops the leading edge of a mat section M' in the manner shown in Figure 2.

An added length of paper or packaging sheet is supplied at the trailing end of each mat section so as to facilitate complete circumferential enclosure of the rolled mat. A length of paper 48 supplied with adhesive 50 is fastened or adhesively joined to the adjacent paper section under the mat M', the major portion of the sheet 48 extending rearwardly of the mat section and above the succeeding mat section M' in the manner illustrated in Figure 2. At the zone of application of the added lengths of paper, a quantity of adhesive 51 is applied to the strip 48 so that at the completion of the package forming operation the paper P in conjunction with the strip 48 completely encircles and envelops the rolled mat and is fastened through the adhesive 51 or other fastening means to the adjacent convolution of the backing paper P.

The conveyor 44 successively advances each mat section provided with the added lengths of paper or sheet material at each end to the inclined support or guide 101 thence on to a table or platen 108 between lateral guiding means 147 into a zone beneath and adjacent the package forming instrumentality or mandrel 80.

When a mat section reaches a position where the forward portion of the mat is adjacent the mandrel 80 the operator initiates a cycling of the machine by closing the manually operated switch 295. At this time the table or platen 108 is in its uppermost position having been moved by the actuator 117 through fluid pressure applied thereto by the actuation of the electrically operated solenoid valve 268 (shown in Figure 9). Assuming that the stripper arm 241 is in its initial inoperative position, the manual closing of the switch 295 energizes the solenoid 294 to admit pressure to the fluid conveying lines leading to the electrically actuated fluid controlling valves.

The air motor solenoid 262 is energized to admit pressure fluid to the motor 82 causing rotation of the latter and the mandrel 80. The roll starter frame actuator 195 is operated through the action of the solenoid controlled valve 267 to move the starter frame 159 to the position shown in Figure 5. Simultaneously with this movement the valve 268 facilitates flow of pressure fluid to the actuator 180 moving the same upwardly to bring the driven mat guiding rolls 175 and 176 into proper position for cooperation with the drive belts 170 and rolls 165 and 166 to direct or feed the mat and adjacent sheet of paper on to the mandrel in the manner illustrated in Figure 5. At the completion of the first convolution of the mat M' on the mandrel, valve 269 is energized by suitable time delay relay means to direct fluid through line 282 above the piston 182 to move the brackets 173 and rolls 175, 176 away from the mandrel. The roll starter frame 158 is then moved away from the mandrel to the position indicated in dotted lines in Figure 5 by operation of the solenoid operated fluid control valve 267 directing fluid pressure through line 270 to move the piston 197 in a lefthand direction as viewed in Figure 5. The rotation of the air motor continues the winding of the mat upon the mandrel 80 in a series of contiguous convolutions. During the winding or formation of the package on the mandrel the table 108 is progressively moved downwardly by the enlarging roll being formed on the mandrel.

Fluid pressure is maintained in the cylinder 117 to exert force against the mat M' concomitantly with the rolling up of the mat to compact the mat and reduce its volume. To obtain uniform thickness of the convolutions of mat being wound on the mandrel a pressure regulating or relief valve 126 (indicated in Figure 9) is arranged to maintain a substantially constant pressure beneath the piston 121 so that the force acting to compact or compress the mat is maintained uniform during the formation of the package. As the last convolution is formed on the mandrel, the strip of paper 48 adjacent the trailing end of the mat is wound into overlapping engaging relation with the outermost convolution of paper P so as to adhesively join the adjacent surfaces thereof through the medium of the adhesive or fastening means 51 to maintain the rolled package in compressed form or state of fixation. At this point in the packaging operation, the operator moves the switch 291, which through suitable relays actuates the air motor solenoid 262 to interrupt the flow of fluid to the motor 82 to stop the rotation of the mandrel 80 and the formed package. The operation of the switch 291 establishes a circuit to the motor 210 to actuate the stripper arm 241 by movement of the carriage 227 in a direction parallel with the mandrel 80. Movement of the stripper 241 in a righthand direction as viewed in Figure 4 removes or strips the completed package from the mandrel. The stripper 241 is returned to its initial position through rotation of the motor 210 until a limit switch operated by the carriage 227 interrupts the circuit to the motor 210. The table 108 is then returned to its uppermost position as shown in Figure 3 so as to direct the next succeeding mat section into juxtaposition with the mandrel 80 preparatory to initiating the cycle of package forming operations.

Figure 11:
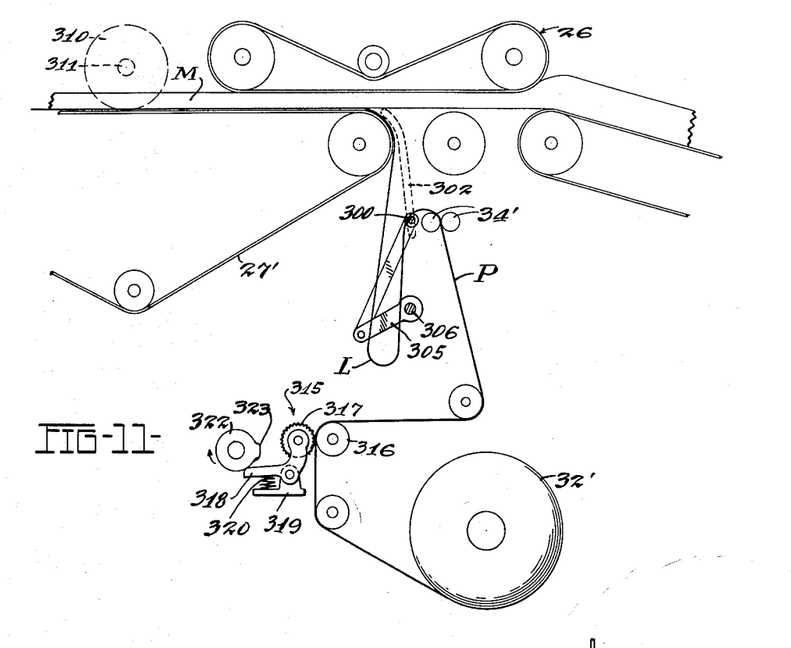
Figure 11 is a semidiagrammatic elevational view showing a form of sheet material feeding means forming part of the invention.

Figure 11 illustrates a form of means for feeding the paper or backing material in a manner to provide for increased length thereof adjacent each mat section for covering the leading edge of a mat section and providing the required amount at the trailing edge to completely enclose the rolled mat through the medium of a single length or strip of paper. The mat M is continuously advanced by means of conveyor 27' while a continuous strip of paper P is supplied from a roll 32' for contiguous disposition with the mat. The paper is advanced by means of feed rolls 34' which are driven at a rate to advance the paper at a greater linear speed than that of the mat M. Through this increase in speed of the paper feed rolls 34', a loop L of paper is formed as illustrated in Figure 11.

Figure 12:
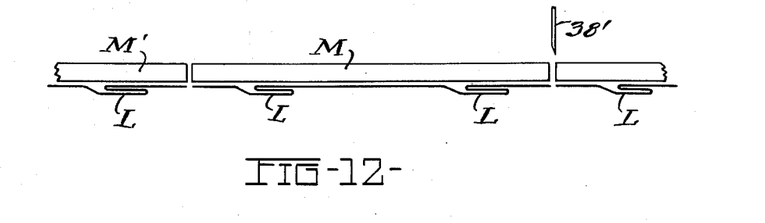
Figure 12 is an elevational view illustrating the correlation of sheet or packaging material with successive sections of fibrous mat.

The arrangement includes means for periodically moving the loops into contiguous relation with the mat M in positions illustrated in Figure 12. Disposed adjacent the feed rolls 34' is a bar 300 extending transversely of the mat M and in parallelism with the feed rolls 34'. The extremities of the bar may extend into cam slots 302 for guiding the bar in a path determined by the contour of the slots 302 indicated in dotted lines in Figure 11. The bar 300 may be reciprocated in the slots 302 by suitable actuating means as for example a crank arm 305 rotatable about the axis of a driving shaft 306. The shaft 306 is arranged to be actuated periodically by means correlated or in synchronized relation with the actuation of the mat severing device 38' shown in Figure 12. As illustrated in Figure 11, the bar 300 is normally disposed adjacent the feed rolls 34' and the excess length of paper passing through the feed rolls 34' overtakes the bar 300 to form the loop L. Periodically the bar 300 may be actuated by the crank 305 to elevate the loop L into contiguous relation with the mat and the friction between the mat and the paper thereafter carries the loop into the relative position illustrated in Figure 12.

As shown in Figure 12, it is desirable to feed the paper at a speed which will provide for the disposition of two loops adjacent each severed mat section M' the forward loop providing the paper to be folded around the leading edge of the mat and the succeeding loop to form the trailing strip for completing the package formation. An operator may withdraw the loops at a convenient station during the travel of the mat sections M' or the same may be withdrawn by mechanical means, if desired. By this arrangement each mat section is provided with an integral strip of paper of a sufficient length to perform the functions above mentioned.

The mat M may be severed or slit into two or more longitudinally extending strips, adjacent sections of which may be packaged in a single roll. When the mats are conditioned in this manner, one or more mat slitting knives 310 may be positioned on a transverse shaft 311, the knives being preferably in the form of peripherally sharpened circular discs to slit mat as the latter moves under the circular knives, one of which is indicated in dotted lines in Figure 11. When this method of packaging mats in coextensively arranged strips is used, it is desirable to perforate the backing sheet or paper P in a zone in alignment with the mat slitting knives. A sheet perforating means is illustrated at 315 in Figure 11 which includes a backing wheel 316 and a perforating wheel 317 supported upon a member 318 which is pivotally carried by bracket 319. The perforating wheel 317 may be biased into perforating engagement with the paper under the influence of a spring 320 or other suitable means.

While the paper may be perforated in a manner above mentioned, it is sometimes desirable to eliminate the perforations in the trailing portion of the paper backing sheet forming the outer circumferential enclosure for the finished package. To this end, the perforator 317 may be intermittently rendered ineffective for predetermined periods of travel of the paper P to provide for spaced unperforated portions of the sheet. This may be accomplished by means such as a cam wheel 322 formed with a projection 323 engageable with the member 318 to intermittently move the perforating roller 317 out of engagement with the paper. The cam wheel 322 may be actuated by means coordinated with the transversely arranged mat severing bar 38' so that the unperforated portions of the paper will be disposed adjacent the trailing edge of a mat section to provide an unperforated outermost paper convolution as the package enclosure.

Figure 13:
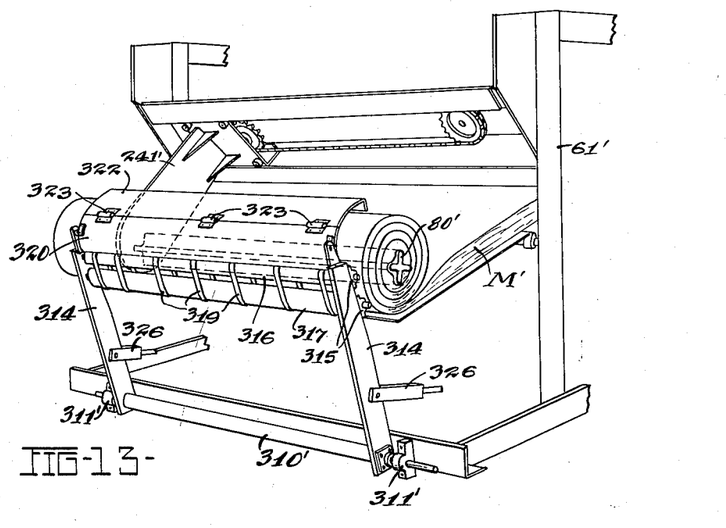
Figure 13 is a perspective view showing a modified form of roll package starting means.

Figure 13 illustrates a modified form of package roll starting means. The machine frame 61' supports a shaft 310' journaled in blocks 311' secured to the frame. Fixedly secured to the shaft or member 310 are upwardly extending struts 314 the upper portions of the struts 314 supporting members 315 forming journals for rolls 316 and 317. The rolls 316 and 317 are adapted to support a series of mat feeding belts 319 which engage and feed a mat section M' into engagement with the mandrel or package forming instrumentality 80', the rolls 316 and 317 being rotated by suitable means (not shown). Secured to the struts 314 is a metal plate 320 of arcuate shape to which is articulately secured a second plate or guide member 322. The guide 322 is connected to the plate 320 by means of hinges 323. The struts 314 and adjuncts associated therewith may be biased toward the mandrel by actuating means (not shown) connected to clevis members 326 so as to position the mat feed belts 319, the guide plates 320 and 322 in juxtaposition with the mandrel 80' to effect a starting or initial winding of the mat upon the mandrel.

In operation, the leading edge of the mat section M' is conveyed upwardly and around the mandrel 80' by the feed belts 319, the guide plates 320 and 322 acting to direct the mat into a circular path to form the first or prime convolution on the mandrel. Upon completion of the first convolution, the frictional component between the mandrel and the mat is adequate to cause the mat to be rolled up upon the mandrel in the manner hereinbefore explained. The guide plate 322, being hingedly connected to the plate 320, is moved about the axis of the hinges 323 as the mat roll increases in size. After the package is completed, a stripper plate 241' removes or strips the completed package from the mandrel.

Figure 14:
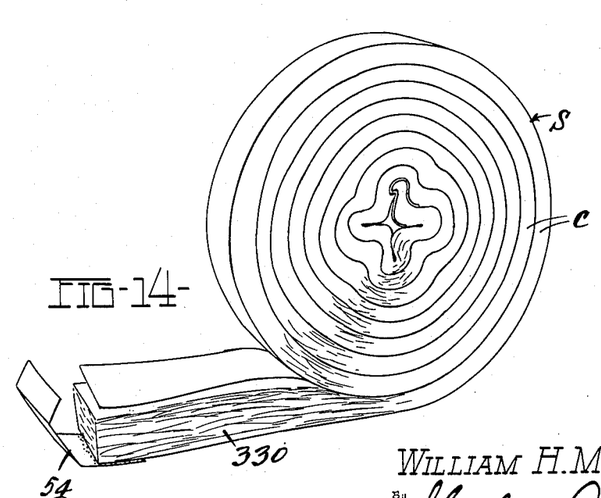
Figure 14 illustrates a section of packaged fibrous material.

Figure 14 illustrates a section of the rolled or packaged mat S illustrating the reduction in thickness of the convolutions C of the mat as compared with the opened end portion 330 of the section. It should be noted that the portion 330 of the mat is of greater thickness than the convolution C illustrating the compressed or compacted condition of the mat in convoluted form as compared with the portion 330 wherein the fibers have expanded or returned to their normal or uncompressed condition. Thus, through the utilization of the method and apparatus of the present invention, a mat of resilient mineral fibers may be compacted or packaged into much reduced volume as compared to its normal size in a manner wherein the fibers of the convolutions are compressed uniformly to a controlled degree which will not cause injury or crushing of the fibers and yet result in a comparatively small package greatly facilitating handling and shipping thereof and effecting substantial savings in packaging and transportation expense.

It is apparent that, within the scope of the invention modifications and different arrangements may be made other than is herein disclosed, and the present disclosure is illustrative merely, the invention comprehending all variations thereof.

I claim:

1. A method of packaging materials including the steps of conveying a continuous mat of mineral fibers in a rectilinear direction; of concomitantly moving a packaging sheet into contiguous relation with the mat; of severing the mat into sections; of establishing sections of the packaging sheet for said mat sections of greater lengths than the respective mat sections; of directing the sheet section around and embracing the leading edge of the mat section; and of successively feeding the mat sections and adjacent lengths of sheet material to a packaging zone; of rolling each mat and adjacent sheet section around a support to form a closely convoluted package, applying an adhesive strip to the outermost convolution of sheet material to maintain the mat in a rolled package, and sliding the package from the support.

2. A method of packaging fibrous material including the steps of moving a continuous mat of fibers in a rectilinear direction; of moving a sheet of wrapping material into juxtaposed relation with the mat of fibers; of promoting spaced loops in the sheet of wrapping material and moving said loops into contiguous relation with the mat of fibers; of severing the mat and wrapping sheet between successive loops of the sheet whereby the section of sheet material adjacent each severed section of mat includes a loop providing a greater length of sheet section than the mat section; of moving a portion of the sheet section provided by the length of a loop around and embracing an end of the adjacent mat section, and of rolling up the mat and sheet in a manner whereby the mat is enclosed by the adjacent section of wrapping material.

3. A method of orienting glass fibers and sheet of paper including the steps of moving a continuous mat of glass fibers and a continuous sheet of paper into contiguous relation; of feeding the sheet of paper at a rate exceeding the rate of movement of the mat of glass fibers; of separating the mat of glass fibers and paper into sections in a manner whereby each section of paper is of greater length than the adjacent section of glass fibers; of moving a portion of the greater length of paper around and embracing an end of the adjacent section of glass fibers; and of winding each mat section with the adjacent section of paper around a support in successive convolutions to form a rolled package, and sliding the package from the support.

4. A method of orienting mineral fibers and sheet material including the steps of moving a continuous layer of mineral fibers and a continuous sheet of material into contiguous relation; of periodically promoting folds in the sheet; of severing the layer of mineral fibers and the sheet material into sections in a manner whereby a fold in the sheet material lies adjacent a severed section of mineral fibers providing a length of sheet material greater than that of the adjacent section of mineral fibers, folding a portion of the sheet section approximately equal to the length of a fold around the leading edge of the adjacent mat section, winding each section of mineral fibers and sheet material around a support into a rolled package, and removing the package from the support.

(References on following page)

References Cited in the file of this patent

UNITED STATES PATENTS

| | | |
|---|---|---|
| Re. 13,794 | Clayton et al. | Sept. 1, 1914 |
| 175,404 | Adamson | Mar. 28, 1876 |
| 619,234 | Schulze | Feb. 7, 1899 |
| 659,432 | Bessonette | Oct. 9, 1904 |
| 1,145,630 | Taft | July 7, 1915 |
| 1,710,979 | Herbener | Apr. 30, 1929 |
| 2,048,042 | Wedge | July 21, 1936 |
| 2,270,043 | Fourness | Jan. 13, 1942 |
| 2,425,301 | Browner | Aug. 12, 1947 |
| 2,568,260 | Spagnoli | Sept. 18, 1951 |
| 2,603,926 | Adams | July 22, 1952 |
| 2,681,702 | Kuenn | June 22, 1954 |
| 2,691,257 | Vogt | Oct. 12, 1954 |
| 2,792,219 | Frank et al. | May 14, 1957 |
| 2,861,403 | Weisman | Nov. 25, 1958 |